United States Patent
Schuthe et al.

(10) Patent No.: US 11,833,693 B2
(45) Date of Patent: Dec. 5, 2023

(54) METHOD FOR SAFEGUARDING THE WORK AREA OF A MOBILE LOGISTICS ROBOT USING ADAPTIVE PROTECTION ZONES

(71) Applicant: STILL GmbH, Hamburg (DE)

(72) Inventors: Dennis Schuthe, Tostedt (DE); Abel Bengt, Luneburg (DE); Ralf Koenig, Adendorf (DE)

(73) Assignee: STILL GmbH, Hamburg (DE)

( * ) Notice: Subject to any disclaimer, the term of this patent is extended or adjusted under 35 U.S.C. 154(b) by 279 days.

(21) Appl. No.: 17/277,176

(22) PCT Filed: Sep. 19, 2019

(86) PCT No.: PCT/EP2019/075122
§ 371 (c)(1),
(2) Date: Mar. 17, 2021

(87) PCT Pub. No.: WO2020/064490
PCT Pub. Date: Apr. 2, 2020

(65) Prior Publication Data
US 2021/0370512 A1    Dec. 2, 2021

(30) Foreign Application Priority Data

Sep. 28, 2018  (DE) ..................... 10 2018 007 724.2
Oct. 22, 2018  (DE) ..................... 10 2018 126 216.7

(51) Int. Cl.
*B25J 9/16*    (2006.01)

(52) U.S. Cl.
CPC .......... *B25J 9/1666* (2013.01); *B25J 9/1674* (2013.01); *G05B 2219/37631* (2013.01); *G05B 2219/40298* (2013.01); *G05B 2219/50393* (2013.01)

(58) Field of Classification Search
CPC .................. B25J 9/1666; B25J 9/1674; G05B 2219/31005; G05B 2219/37631;
(Continued)

(56) References Cited

U.S. PATENT DOCUMENTS 9,740,193 B2 * 8/2017 Hunt .................. G05B 19/4061
10,168,699 B1 * 1/2019 Theobald ............. G05D 1/0088
(Continued)

FOREIGN PATENT DOCUMENTS

DE    102010007025 A1    8/2011
DE    102015220495 A1    4/2017
(Continued)

*Primary Examiner* — Dale Moyer
(74) *Attorney, Agent, or Firm* — THE WEBB LAW FIRM

(57) ABSTRACT

A method for the protection of a work area of a mobile logistics robot in changing work environments, the method including controlling the mobile logistics robot using a control system, scanning the current work environment using a sensor system, monitoring the current work environment using a safety system, in which the control system autonomously defines a planned safe work area in a new work environment, and the safety system autonomously verifies and monitors the defined work area as a clear protection zone, and in the event of a breach of the clear protection zone by the entry of an object into the clear protection zone, the mobile logistics robot is automatically placed in a safe status.

13 Claims, 3 Drawing Sheets

(58) Field of Classification Search
CPC .......... G05B 2219/39082; G05B 2219/40202;
G05B 2219/40298; G05B 2219/50393;
Y02P 90/02; G05D 1/0214
See application file for complete search history.

(56) References Cited

U.S. PATENT DOCUMENTS

| | | | | |
|---|---|---|---|---|
| 2017/0197311 A1* | 7/2017 | Garcia | .................. | G01S 15/931 |
| 2018/0200888 A1* | 7/2018 | Kim | ...................... | A47L 9/2857 |
| 2018/0326586 A1* | 11/2018 | Magnanimo | ............ | F16P 3/144 |
| 2018/0333869 A1* | 11/2018 | Ding | ...................... | B25J 9/0084 |

FOREIGN PATENT DOCUMENTS

| | | | | |
|---|---|---|---|---|
| DE | 202017103611 U1 * | 10/2018 | ................ | F16P 3/00 |
| DE | 202017103611 U1 | 10/2018 | | |

* cited by examiner

METHOD FOR SAFEGUARDING THE WORK AREA OF A MOBILE LOGISTICS ROBOT USING ADAPTIVE PROTECTION ZONES

CROSS REFERENCE TO RELATED APPLICATIONS

This application is a national stage application for International Patent Application No. PCT/EP2019/075122, filed Sep. 19, 2019, which claims priority to German Patent Application No. DE 10 2018 007 724.2, filed Sep. 28, 2018, and German Patent Application No. DE 10 2018 126 216.7, filed Oct. 22, 2018, the disclosures of which are incorporated in their entireties by reference.

BACKGROUND OF THE INVENTION

Field of the Invention

The present disclosure relates to a method for safeguarding a work area of a mobile robot in changing work environments, whereby the logistics robot is controlled by a control system and the current work environment is detected by a sensor system and monitored by a safety system.

Description of Related Art

Robots are used with increasing frequency in industry and in logistics operations to automate processes in industrial fabrication and to automate the performance of logistics tasks, for example in order picking operations. These operations generally use robots with arm manipulators, in particular robotic arms. One example of this type of robot is an articulated arm robot.

Robotic applications of arm manipulators in modern industrial automation are generally operated in separated working areas, which are generally in the form of safety cages that are monitored by sensors. In one current development, the prior art describes early collaborative robot concepts in which people and robots work in the same work environment. For safety reasons, however, the speed of work is severely restricted in such robot concepts. The collaborative speed is typically a maximum of 250 mm/s. On account of the need for safety-relevant force and torque sensors, robot concepts of this type also have very high product costs. Moreover, frequently only very small payloads (in the range of a few kilograms) can be lifted, so that there is an unfavorable ratio of payload to dead weight.

The majority of modern robotic solutions can be characterized as stationary robotic solutions because the robot arm is either anchored to the ground in a fixed manner or is mounted so that it can move on a linear axis. The result is a severely restricted three-dimensional working area which is conventionally partitioned off by a safety fence. There are early mobile approaches with robot arms on freely movable platforms.

Examples of these approaches are automated guided vehicles (AGVs) as well as driverless industrial trucks, in particular mobile order-picking robots. As a rule, however, these solutions cannot be used in collaborative operations without a spatial separation from human operators.

One variant of stationary installed safety fences also includes early approaches that use virtual safety fences in which the clear area around the robot is scanned by means of appropriate sensors (e.g. laser scanners). In the event of a breach of the protection zone defined by the virtual protection fence, the robot is securely restricted in its movements or shut down.

The need for spatial separation of robots and human beings creates an obstructive barrier to the use of collaborative operating concepts with a human-robot collaboration. Collaborative operation with humans and robots in areas used simultaneously by humans and robots is frequently not possible with mobile robotic units such as those that are mounted on movable platforms, for example. Concepts with kinematics adapted to the specific application in which the avoidance of hazards is achieved by the shape of the robot housing severely restrict the kinematic scope of movement.

As a consequence of these obstacles, there are only very limited applications in which the collaborative robot concepts of the prior art can be used on account of their characteristics. Therefore, they have currently achieved only an extremely small market penetration. The realization of collaborative concepts using logistics robots, in particular autonomous industrial trucks with robot arms for load handling, e.g. mobile order-picker robots, is particularly challenging because logistics robots are designed to move freely in a logistics area such as a warehouse, for example. During this process, they are constantly encountering altogether new work environments that must be made safe.

SUMMARY OF THE INVENTION

The object of the present disclosure is to provide a method for the safe operation of a mobile, freely movable logistics robot that becomes possible even in changing working environments in collaborative operation with human beings.

This object is accomplished by the present disclosure in that the control system autonomously defines a planned, safe work area in a new work environment and the safety system autonomously verifies and monitors the defined work area as a clear protection zone, and in the event of a breach of the protection zone by the intrusion of an object into the clear protection zone automatically places the logistics robot in a safe state.

The method according to the present disclosure is, therefore, capable of autonomously recognizing a safe protection area for a new work environment and having it monitored by the safety system. In contrast to conventional stationary installed safety fences and stationary defined virtual protection fences, the adaptive protection zones according to the present disclosure can be continuously adapted to different work environments.

In one preferred embodiment of the present disclosure, the control system transmits a mathematical description of the defined work area to the safety system.

It is thereby advantageous that the electronic control system of the logistics robot does not itself need to be safe. Therefore, for example, a conventional robot arm control system can be used. The protection is provided by means of the safety system which can be designed as an independent electronic safety control system.

Advantageously, a non-safe control system, by means of sensors, scans the work environment and defines the planned safe work area. Subsequently, the non-safe control system transmits the planned safe work area in the form of a mathematical description (preferably in the form of a polygon) to the safety system, which applies this definition for its safety sensors, which are preferably in the form of scanners. These can be the same sensors used for the scanning of the work environment by the non-safe control system. The safety system confirms that the protection zone is clear (i.e. unoccupied).

In one example of the present disclosure, the control system selects the protection zone that covers the planned safe work area from a predefined set of protection zones.

In this example also, the non-safe control system, by means of sensors, scans the work environment and, from the predefined set of protection zones, selects the protection zone that covers the planned safe work area and appropriately matches a known contour of the planned safe work area. Then, the non-safe control system transmits the planned safe work area to the safety system, which references this definition for its safety sensors, which are preferably in the form of scanners. These can be the same sensors used for the scanning of the work environment by the non-safe control system. The safety system confirms that the protection zone is clear (i.e. unoccupied).

The non-safe control system can also be used for this purpose. The non-safe control system selects, from a pre-defined set of protection zones, the protection zone that appropriately matches the detected contour of the planned work area. The contour of the protected fields can be selected arbitrarily. Without in any way restricting the general application of the invention, rectangular protection zones in particular can be used as a start.

The approach described above provides in particular the control system consisting of the non-safe control system, for example a robotic control system, and a (monitoring) safety system. This division of tasks is appropriate because safe control systems generally have a very restricted functional scope and are incapable of simulating more complex algorithms.

The variant described below reduces the algorithmic complexity so that the method according to the present disclosure can also be implemented in a safe control system with a simpler structure.

Instead of scanning the work environment to define a suitable protection zone, the simplification provides that a defined fixed set of protection zones is iteratively applied by the safety system to the changing work environment.

Accordingly, one advantageous embodiment of the present disclosure relates to a method in which the control system iteratively applies a predefined set of protection zones to the work environment, whereby the following algorithm is applied (where i is an incremental index value):
1. Selection of protection zone i that is small,
2. Verification by the safety system whether protection zone i is clear,
   2.1 if protection zone i verified as clear: Continue with Step 3,
   2.2 if protection zone i verified as occupied: stop loop, continue to step 5:
3. Selection of new protection zone i that is next largest,
4. Continue with Step 2.
5. Definition of the largest possible protection zone as the most recent protection zone verified as clear (at index i−1).

The pre-defined set of protection zones thereby includes rectangular protection zones. Depending on the characteristics of the work environment, however, it can also include protection zones of different shapes.

In one development of the present disclosure, the clear protection zone is placed so close to an adjacent contour of the work area that no person can enter the area in between.

This development therefore provides that the protection area is placed very close to the adjacent contour. Consequently, there remains only a small area that is not monitored. According to current standards, the area that is not monitored must be selected so that no person can enter it. With this development, this requirement is satisfied in that the adaptive protection zone is defined so that the protection zone not monitored remains below the limit specified in the standard.

The clear protection zone is thereby preferably located so close to an adjacent contour of the work area that a maximum distance of 10 cm remains between the clear protection zone and the adjacent contour.

With the method according to the present disclosure, a cohesive, gap-free protection zone may be created and verified which can be delimited by means of a locus that is preferably specified by a polygon. In a further embodiment of the present disclosure, a plurality of clear protection zones are combined. The result is a non-cohesive protection zone which can therefore also have gaps.

In one practical embodiment of the present disclosure, the control system defines the planned safe work area by evaluating sensor data. For this purpose, at least one sensor in the form of a scanner preferably scans the work environment. A laser scanner is thereby appropriately used as a sensor.

In one preferred application of the present disclosure, as the logistics robot, a mobile, freely movable robotic vehicle is used, in particular an autonomous industrial truck, with at least one robot arm for load handling in a changing work environment, whereby the control system controls at least the robot arm.

This application advantageously uses the non-safe control system as the control system, the control measures of which are monitored by the safety system.

Another appropriate variant of the present disclosure provides that the safe control system into which the safety system is integrated is used as the control system.

The present disclosure offers a series of advantages, including work areas without a fixed separation of protection zones that can be enclosed.

In addition, the working speed can be increased because the robots can be moved at "non-collaborative" speeds. Moreover, larger payloads can be handled, because no permanent force and torque monitoring of the robot is necessary, and therefore larger payloads can be moved at increased speeds which are above the monitoring limits. The costs for the sensor system can also be reduced because no collision monitoring by a robot-mounted sensor system is necessary. Finally, the cost for the robot arm can likewise be reduced because standard industrial robots can be used instead of more expensive collaborative robots.

BRIEF DESCRIPTION OF THE DRAWINGS

Additional advantages and details of the present disclosure are explained in greater detail below with reference to the exemplary embodiments illustrated in the accompanying schematic figures, in which.

DESCRIPTION OF THE DISCLOSURE

For purposes of the description hereinafter, spatial orientation terms, as used, shall relate to the referenced aspect as it is oriented in the accompanying drawings, figures, or otherwise described in the following detailed description. However, it is to be understood that the aspects described hereinafter may assume many alternative variations and configurations. It is also to be understood that the specific components, devices, features, and operational sequences illustrated in the accompanying drawings, figures, or otherwise described herein are simply exemplary and should not be considered as limiting.

Figure 1:
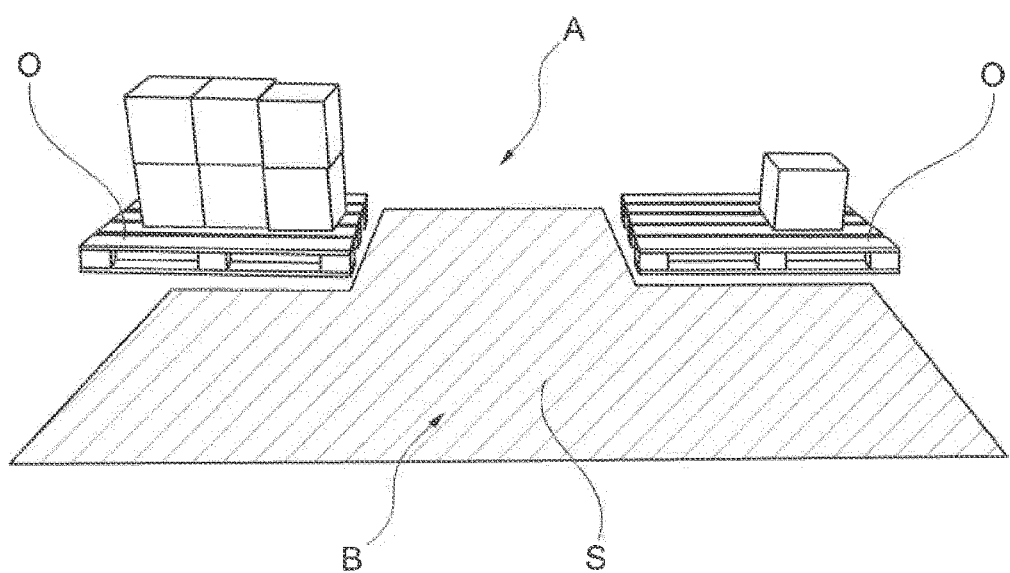
FIG. 1 shows the definition of a protection zone in an adaptively protected work environment.

FIG. 1 illustrates the definition of a protection zone S in an adaptively protected work environment A. In this example, the protection zone S is defined by a polygon S. For this purpose, the non-safe control system of the logistics robot (not shown in FIG. 1) scans the work environment A by means of sensors and defines the planned safe work area B. As illustrated in FIG. 1, a work area B is selected which is not occupied by objects O, in this case by pallets O. Then the non-safe control system transmits the planned safe work area B in the form of a mathematical description (here in the form of a polygon S) to a safety system which applies this definition for its safety sensors which are in particular in the form of scanners. The safety system confirms that the protection area S is clear (unoccupied).

Figure 2:
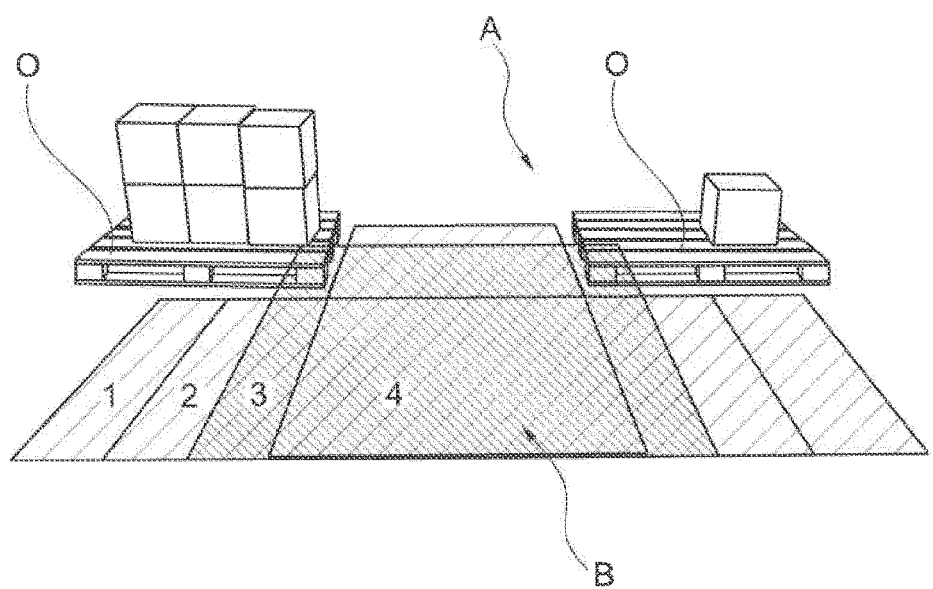
FIG. 2 shows a set of predefined protection zones in an adaptively protected work environment.

FIG. 2 shows a set of predefined protection zones 1, 2, 3, 4. The protection zones 1, 2, 3, 4 may be in the shape of rectangles, for example. For this purpose, the non-safe control system of the logistics robot (not shown in FIG. 2), by means of sensors, scans the work environment A and defines the planned safe work area B. The protection zones 1, 2, 4 are clear, i.e. unoccupied, while the protection zone 3 is occupied by objects O, in this case by pallets O. From the predefined set of protection zones 1, 2, 3, 4, the non-safe control system of the logistics robot (not shown in FIG. 2) selects the protection zones 1, 2, 4 that suitably match the known contour of the planned work area B. Then the non-safe control system transmits the unoccupied protection zones 1, 2, 4 to a safety system, which applies them for its safety sensors, which are in particular in the form of scanners. The safety system confirms that the protection zones 1, 2, 4 are clear (unoccupied).

Figure 3:
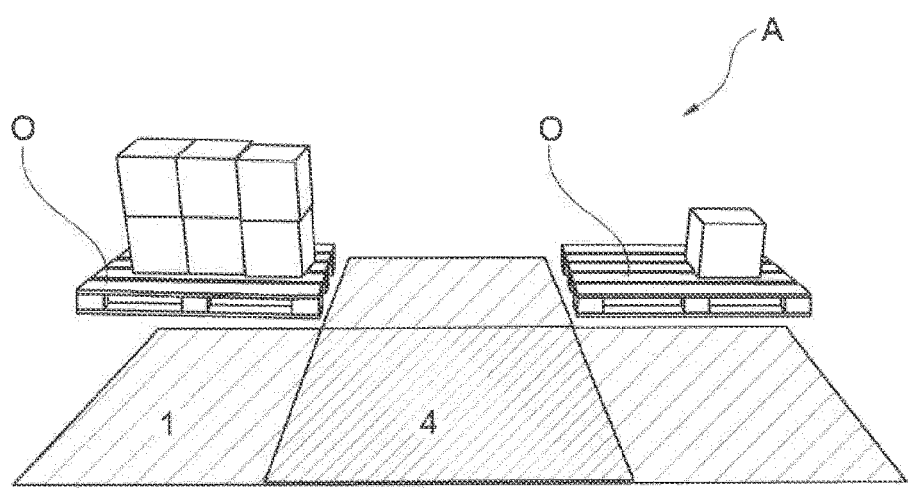
FIG. 3 shows the selection of maximum, unoccupied protection zones to protect the work environment of the robot.

FIG. 3 shows how the maximum unoccupied protection zones 1 or 4 are selected by means of an iterative method. The control system of the logistics robot (not shown in FIG. 3) thereby iteratively applies a predefined set of protection zones to the work environment A. This example uses the same set of protection zones 1, 2, 3, 4 as in FIG. 2, whereby in FIG. 3, only the result of the iterative method is shown. First, a small protection zone (e.g., protection zone 2) is selected. The safety system verifies whether the protection zone is clear. If it is, the next larger protection zone is selected (e.g., protection zone 1, 3, or 4). This process is continued until the largest possible protection zone is defined as the last protection zone verified as a clear protection zone (e.g., protection zone 1 or 4). In this example, these are the protection zones 1 or 4 which are not occupied by the objects O, in this case the pallets O.

While aspects of the present invention are shown in the accompanying figures, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A method for the protection of a work area of a mobile logistics robot in a changing work environment, the method comprising:
controlling the mobile logistics robot using a control system;
scanning a current work environment using a sensor system;
monitoring the current work environment using a safety system,
wherein the control system autonomously defines a planned safe work area in a new work environment, and the safety system autonomously verifies and monitors the planned safe work area as a clear protection zone, and in the event of a breach of the clear protection zone by an entry of an object into the clear protection zone, the mobile logistics robot is automatically placed in a safe status,
wherein the control system iteratively applies a predefined set of protection zones to the new work environment, whereby the following algorithm is used:
1) Selection of a protection zone of the predefined set of protection zones that is small, to be a selected protection zone,
2) Verification by the safety system whether the selected protection zone is clear,
2a) If the selected protection zone is verified as clear: continue with step 3),
2b) If the selected protection zone is verified as occupied: continue to step 5),
3) Selection of a protection zone of the predefined set of protection zones that is next largest, to be the selected protection zone,
4) Continue with step 2),
5) Definition of the planned safe work area as a protection zone that was last verified as clear;
wherein the predefined set of protection zones comprises at least two protection zones, and
wherein at least one protection zone of the predefined set of protection zones is verified as clear, and at least one protection zone of the predefined set of protection zones is verified as occupied.

2. The method according to claim 1, wherein the control system transmits a mathematical description of the planned safe work area to the safety system.

3. The method according to claim 1, wherein the control system, from the predefined set of protection zones, selects the clear protection zone that covers the planned safe work area.

4. The method according to claim 1, wherein the predefined set of protection zones comprises rectangular protection zones.

5. The method according to claim 1, wherein the clear protection zone is placed so close to an adjacent contour of the predefined safe work area that no person can enter a space in between.

6. The method according to claim 5, wherein the clear protection zone is placed so close to the adjacent contour of the predefined safe work area, that a maximum distance of 10 cm remains between the clear protection zone and the adjacent contour.

7. The method according to claim 1, wherein the clear protection zone comprises a combination of a plurality of protection zones that are clear.

8. The method according to claim 1, wherein the control system defines the planned safe work area by an evaluation of sensor data.

9. The method according to claim 1, wherein the sensor system comprises at least one sensor in the form of a scanner that scans the current work environment.

10. The method according to claim 9, wherein a laser scanner is used as the at least one sensor.

11. The method according to claim 1, wherein, the mobile logistics robot comprises a mobile robotic vehicle including an autonomous industrial truck with at least one robot arm for load handling, whereby the control system controls at least the at least one robot arm.

12. The method according to claim 1, wherein the control system comprises a non-safe control system, and wherein the safety system monitors control measures of the non-safe control system.

13. The method according to claim 1, wherein a safe control system is used as the control system, into which the safety system is integrated.

\* \* \* \* \*